United States Patent Office 3,450,655
Patented June 17, 1969

3,450,655
NON-AQUEOUS SUSPENSION FOR ELECTROPHORETICALLY COATING ARTICLES COMPRISING A PIGMENT AND AN ORGANIC-SOLVENT-SOLUBLE THERMOSETTING RESIN
Lester L. Spiller, Indianapolis, Ind., assignor to Ransburg Electro-Coating Corp., Indianapolis, Ind., a corporation of Indiana
No Drawing. Filed Apr. 9, 1965, Ser. No. 447,090
Int. Cl. C09d 5/24; C08g 3/58, 3/80
U.S. Cl. 260—22         25 Claims

ABSTRACT OF THE DISCLOSURE

A non-aqueous suspension for electrophoretically coating conductive articles comprises a pigment having a particle size of 0.1 to 10 microns and an organic-solvent-soluble alkyd, epoxy or acrylic resin colloidally suspended in organic solvent having a dielectric constant of 2 to 6. The solids are 5 to 30% of the composition and the pigment-to-resin ratio is required to be 0.4 to 0.166. Means such as the combination of polar and non-polar solvents is provided to cause the resin particles to assume a more particulate colloidal character with reduced viscosity and increased mobility. A. D.C. voltage (preferably with superimposed A.C.) is impressed between a suitable electrode and the article to be coated while it is immersed in said composition.

---

This invention relates to improved coating compositions, to new and useful coating methods, and to the novel products formed thereby.

More particularly, the present invention relates to improved non-aqueous compositions and processes for coating surfaces with such improved compositions using high voltage, low amperage electro-deposition techniques, which, heretofore, have been little understood in the prior art.

The present invention contemplates such coating materials as certain paints comprising such binder-containing substances as resins, certain dissolved resinous macromolecules, certain dyes, and most preferably colloidal suspensions of certain resins and/or pigmented colloidal suspensions of resins, together with certain types of pigments and/or dyes, especially pigments per se and/or pigmented materials containing adsorbed dyes, wherein the pigments or pigmented materials have a certain specific critical size and ratio as to amount of the pigment relative to that of the resin or binder.

The invention has particular application to coating not only articles of manufacture having regular contour, but especially to coating articles extremely uniformly with certain pigments together with the thermosetting resins such as and preferably alkyd resins, epoxy resins, and/or acrylic resins wherein the surface of such articles being coated have irregular contours. As will be more fully described hereinafter, such articles being coated may comprise, in different embodiments of the present invention, non-conducting, semi-conducting or conducting substances such as metal, plastic, glass, paper, cloth, certain films and analogous substances.

It is known to electro-deposit weak dispersions (0.5 percent) of resins from non-aqueous media. However, this method has not been found to be at all satisfactory in producing high quality coatings as to thickness and surface appearance. Also, in the case of certain styrene-containing resin coatings, when the electro-motive force is increased beyond 300 volts, at an electrode spacing of 0.25 inch, the thickness of the deposit decreases (rather than increases) rapidly. It is, therefore, apparent that knowledge in the field of coating articles of manufacture such as metal, by means of non-aqueous electrophoresis heretofore has left much to be desired.

Field responsive compositions are also known which comprise an inert liquid having substantial stability to an electric field and a dielectric constant of about 2.0 to 5.5 and having suspended therein from 35 percent to 85 percent non-conductive solid materials such as, for example, silica gel, barium titanate, magnesium silicate, and the like, together with minor proportions of methacrylic polymers or polyisobutylene and about (approximately) 0.75 percent to 15.00 percent alcohol, water, or especially adsorbed water and/or water of hydration on the surface of the solid materials aforementioned. Such compositions also require about 5.0 percent to 15.0 percent by weight of surface active agents which may, for example, be of the nonionic type, including among others, fatty acid esters of ethylene glycol, sorbitol monoleate, etc. However, such compositions have not been found useful for the purposes of the present invention of applying uniform electro-deposited coatings on surfaces because the total composition just described, when placed between two conductors and subjected to an electric field, becomes "electro-viscous" to such an extent that the viscosity increases approximately as the square of the intensity of the electric field. In fact, such "electro-viscosity" is so pronounced that, for all intents and purposes, the composition, when subjected to the electric field, may be characterized as a solid.

It has been further proposed to form resinous compositions of at least about one-third resin content dissolved in a solvent consisting of a combination of a low dielectric liquid hydrocarbon together with a halogenated hydrocarbon; and to deposit a coating of solid resin on an article of manufacture by immersing the article in a bath containing the aforementioned composition and by applying high voltage between two electrodes while the article is thus immersed. The resin solution optionally may contain therein such materials as toluidine red, yellow litharge, or the resin employed may comprise a prepigmented resin and the article preferably constitutes one of the electrodes.

The proposition just described has been attempted to be utilized yet without success. Such proposition has, however, described an indiscriminate voltage range of between 500 and 100,000 volts; and it is perhaps this variance which has rendered this process of the prior art inoperative. Alternatively, the preferred process described in the aforesaid proposition of the prior art utilizes an electromotive force of 15,000 volts at an electrode spacing of about 1.00 to 1.25 inches. Perhaps this voltage and electrode spacing is not correct for the electrodeposition rate of the desired thermosetting resins such as alkyd resins, epoxy resins and/or acrylic resins. Also, the specific embodiments described in the foregoing prior proposed process have not tested titanium dioxide as a pigment, which has been found to be extremely desirable for the purposes of the present invention. Also, the process proposed above always requires that the pigment and resin, together with a dryer and a carrier, be made in paste-form, with the carrier being a hydrocarbon liquid, with the subsequent dispersing of the resulting paste in a halogenated hydrocarbon such as carbon tetrachloride. Critical pigment-to-resin ratios are not recognized in this prior process, such critical ratios being a discovery of the present invention as claimed hereinafter.

No matter what the reasons are for the inoperativeness of the prior art coating processes using non-aqueous suspending media for electrophoretic deposition, a high voltage electrophoretic coating process using non-aqueous systems would be distinctly advantageous, but must be performed in accordance with the discovery of the present invention in order to be effective or in some instances even to be operative and this process of the invention will be described hereinafter in more detail.

The advantages of non-aqueous electro-deposition of paints and the like has manifold advantages when performed in accordance with the invention. For example, not only greater film thickness is obtained, but also greater uniformity of thickness of deposition results due to the fact that compared to a mere dipping procedure (wherein the article of manufacture is merely dipped and then removed from a bath), during subsequent draining and drying, "beads" of great thickness do not tend to form in accordance with the invention on the lower portion of the metal surfaces, at the sacrifice of little or no deposition remaining on the upper surface. Also, non-aqueous media, unlike water, are non-corrosive to metal equipment as well as to the metal surfaces being coated. Additionally, many pigments and additives may be used in accordance with the present invention which perform poorly or are unstable in aqueous media.

Additional advantages of the present invention include the fact that although the voltage required is high, the amperage needed is extremely low, making the power consumption ($I^2R$) considerably less than when using aqueous systems. Also, in a non-aqueous electro-deposition system, no counter ions accumulate in the bath to the undesirable large extent as in aqueous systems. Thus, the deposition efficiency is extremely high because of the larger amount of coating material deposited per Faraday of electricity passing through the conventional external circuitry. Additionally, the application of second coats over coatings previously applied is possible because the high voltage overcomes the resistance of existing films of paints, oils, and contaminants.

In accordance with the present invention, it has been found that a great number of variables exist in non-aqueous electro-deposited systems. For example, it has been found that total solids content should be between about 5 or 10 and 15 or 30 percent. Also, the ratio of pigment to resin-binder must be maintained at about 1:2.5 to 1:6.0, and preferably between 1:3 and 1:5, with particular outstanding results being obtained at a ratio of 1:3.5 and 1:4.5.

Additionally, in accordance with the present invention, it has been found that particular types of resins are most suitable, whereas, others are only moderately suitable or completely unsuitable for the purposes of the invention. For example, a great variety of alkyd resins are operative as will later be described, as are many modified alkyds. However, the styrenated alkyd resin "Plaskon 3803" and the silicone-modified alkyd resins containing about 23 to 32 percent silicone content are operative for the purposes of the invention. In each of these latter modified alkyd resins, the material formed is a graft copolymer.

Alkyd resins which are heat-convertible resins, or thermosetting, are, in general, operative for the purposes of the present invention. Alkyd resins which are non-convertible by heat and which do not cure appreciably upon heating say at temperatures of say about 275° to 450° F., preferably 325° to 400° F., are not suitable for use in the present invention. In general, useful heat-convertible resins are produced from polyhydric alcohols having at least three hydroxyl groups (e.g., glycerine) and dibasic acids, or, alternatively, are first produced by esterification and later converted by heat-treatment to insoluble products, as is well-known in the art.

It is generally recognized that the alkyd resins or "Glyptals" were first discovered at the General Electric Company in the early 1930's by R. H. Kienle, refinements being developed jointly by R. H. Kienle and either A. G. Hovey or C. S. Ferguson. For a more detailed description of alkyd resins, reference may be made to Chemical Abstracts, vol. 25, p. 3854 (1931); Chemical and Metallurgical Engineering, vol. 39, p. 599 (1932); Journal of the American Chemical Society, vol. 51, p. 509; Industrial and Engineering Chemistry, vol. 8, p. 353 (1931). Also, numerous patents have issued; a patent list being: British Patent 250,949 (to C. F. Peterson), French Patent 704,657 (to The I. G. Farben Company), U.S. Patent 1,413,145 (to L. Weisberg), U.S. Patent 1,995,291 (to W. H. Carothers), Italian Patent 260,488 (to J. H. Schmidt), German Patent 530,707 (to Allgemeine Elektricitats-Ges), German Patent 572,125 (to W. R. May), German Patent 488,582 (to Allgemeine Elektricitats-Ges), German Patent 564,956 (1930) (to H. W. Warren), German Patent 580,931 (1933) (to General Electric Company), U.S. Patent 1,897,260 (to Kienle et al., assigned to G.E.), U.S. Patent 2,007,965 (to Carleton Ellis and assigned to G.E.).

Other journal publications having more complete background concerning alkyd resins include, among others, Journal of the American Chemical Society, vol. 52, p. 314 (to W. H. Carothers and F. J. van Natta) as well as the 1963 publication by Mraz and Silver of the Hercules Powder Company of Wilmington, Del.; in Encyclopedia of Chemical Technology, vol. 1, pp. 663–734 (Wiley).

The epoxy resins useful for the purposes of the present invention form a relatively new class of cross-linked polyethers characterized by excellent chemical resistance, good adhesion to metals and ease and precision of fabrication. In the preparation of epoxy resins, typically epichlorohydrin is reacted in the presence of a basic medium such as sodium hydroxide with bisphenol-A, polymerization being preferably initiated by catalysts such as boron trifluoride and/or tertiary amines. Alternatively, primary and secondary amines together with mercaptans and/or certain organic acids and alcohols can also serve as catalysts or co-catalysts as is well known in the art.

Diepoxy compounds, including simple condensation products of epichlorohydrin and aromatic diols such as bisphenol-A are available commercially. These and similar compounds have physical properties useful for the purpose of the present invention only when they are polymerized further, by the addition of a curing or cross-linking agent, in a manner similar to condensation-polymerization. Other useful but less preferred epoxy resins include certain epoxy resins from butadiene dioxide, diglycidyl ether and/or dichlorohydrin, preferably together with a major proportion of epichlorohydrin, highly polymerized with such aromatic diols as 4,4'-dihydroxy-bisphenyl, dihydroxyl diphenyl sulfone and/or bisphenol-F, preferably together with a major proportion of bisphenol-A.

Acrylic resins useful for the purposes of the invention can be obtained from a variety of monomers, such as acrylic and methacrylic acids, their salts, esters, and amides, and the corresponding nitriles, the most important monomers being methyl methacrylate, ethyl acrylate, and/or acrylonitrile.

Polymethyl methacrylate is distinguished as a hard resin with good resistance to light and aging when used in the compositions of the present invention. The monomeric methyl methacrylate may be prepared by the dehydration and methanolysis of acetone cyanohydrin by procedures and reaction conditions well known in the art. Polymerization may be initiated by free-radical catalysts such as peroxides, or by organometallic compounds, such as butyl lithium. Free-radical polymerization may be carried out in bulk, in solution, or in aqueous emulsion. Bulk polymerization ordinarily is used.

During polymerization, about 15 to 25% reduction in volume (e.g., 20%) generally accompanies the conversion of the monomer to polymeric resin. However, this reduction in volume may be largely minimized by using a solution of polymer in the monomer and especially finely divided polymer particles dissolved in the monomer. The resulting resinous material is particularly advantageous for use in the electrophoretic coatings made in accordance with the present invention. More particularly, solutions in aromatic and other solvents of low dielectric constant, particularly solutions of polymethyl methacrylate and its copolymers are particularly desirable for use as colloidal-binders in lacquers, paints, and the like for the non-aqueous electro-deposition and adhesion of pigments to metal surfaces, etc., in accordance with the present invention.

Ethyl acrylate and/or polyethyl acrylate also may be added to the aforesaid compositions; although the polyethyl acrylate, by itself, is somewhat rubbery in nature. However, when copolymerized with methyl methacrylate, it serves to enhance adhesion to the desired surface being coated by non-aqueous electrophoresis by the method of the invention. When monomeric ethyl acrylate is used as an ingredient in acrylic polymers and copolymers in the compositions, electrophoretically deposited in accordance with the invention, the resulting film or coating becomes less brittle. Also, the relatively hard resinous, polymeric methylmethacrylate (together with, in certain instances, polyvinyl acetate and/or polyvinyl chloride or a blend or copolymer of these vinyl compounds) may be made less brittle by incorporation of moderate amounts, not exceeding 10% by weight of total polymeric resin, of ethyl acrylate monomer into the original polymerization reaction mixture.

Ethyl acrylate per se may be produced by the dehydration and ethanolysis of ethylene cyanohydrin, which in turn, is obtained from ethylene oxide. Ethyl acrylate also can be produced by the reaction of acetylene, carbon monoxide, and ethyl alcohol in the presence of a group VIII metal carbonyl, preferably nickel carbonyl. Polymerization and/or copolymerization with other acrylic monomers for use in the electrophoretic compositions of the invention, may be carried out, by means of free-radical catalysts or with butyl lithium, preferably suspended in suitable medium or diluent, as is known in the art.

Other acrylic derivatives such as methyl chloroacrylate and/or cyclohexyl methacrylate are in certain instances, useful in compositions for electro-deposition in accordance with the invention because they form polymeric resins with high softening points and good resistances to scratching. Also, the high molecular weight esters, such as the butyl to octyl esters of acrylic acids, yield non-brittle resins; which, when electro-deposited as a coating in accordance with the invention, exhibit improved adhesion to a variety of materials because they constitute a class of rubber-resins, are vulcanizable, etc. Alternatively, such $C_4$ to $C_8$ acrylic esters may be employed in admixture with the lower polymers and copolymers derived from methyl methacrylate, ethyl acrylate, and acrylonitrile to produce coatings, which, in many instances, are less brittle and more adherent than such lower polymers and/or copolymers alone. However, it is also within the purview of the present invention to utilize such $C_4$ to $C_8$ acrylic derivatives in polymerized form by themselves and/or as a polymerization constituent or reactant so as to produce a resinous polyacrylate terpolymer resin which may be electro-deposited from non-aqueous media in accordance with the invention.

Tests were also conducted utilizing anionic surface active agents. In the case of the anionic surfactant constituting an amino salt of an alkaryl sulfonic acid, it is shown that the resultaning alkaryl sulfonic additive can promote excessive solubility of the resin, compared to utilizing the resin in colloidal form, with the result that optimum electro-deposition effects are not obtained.

The charge of the pigments and extenders as well as the charge on the resin is of considerable importance. For example, it is quite possible to produce a system in which there results an electrophoretic deposit of a resin without any pigment; or the film containing concentrations of pigment may be so high above that of the resin that the pigment cannot be adhered to the surface by the resin. To insure that this is not the case, it is always necessary to arrange both the sign and magnitude of the charge carried by the pigment and the resin-binder so that they are substantially the same.

It has also been found, in accordance with the invention, that although high voltage potential is desired, a maximum potential does exist which is operative and at which best results are obtained for each particular resin-pigment system.

With certain limitations, the general equation for non-aqueous electrophoresis is as follows:

$$u = \frac{eZE}{4n\pi}$$

where $u$ is the velocity of the particles and $e$ is the dielectric constant of the liquid phase, $z$ is the electrokinetic potential, also called zeta potential, or the potential across the diffuse layer of dispersing phase between solid and bulk of liquid, $n$ being the viscosity of the dispersing liquid, with E being the electric field strength.

It has been further found that the above equation applies not only as to DC current but also as to AC current which has been rectified to create pulsating DC current. Further, at certain high voltages contemplated, in accordance with the invention, Ohm's law does not apply.

As before mentioned, there is a critical voltage beyond which electro-deposition decreases rather than increases and beyond which the foregoing equation does not apply and this must be determined for each particular system.

It has been also found that the number of variables involved in the non-aqueous electro-deposition of paints, varnishes, and such resins as alkyds, acrylics, and epoxies are much greater than indicated by the above equation. Some of these variables are (1) the particular resin used (symmetry, polarity, solubility, degree of polymerization, and curing or cross-linking ability); (2) properties of solvent and precipitant (conductivity, moisture content, dielectric constant, dispersing power, purity, and relative volatility of solvent to precipitant in that the precipitant must be less volatile than the solvent); (3) viscosity of the dispersing phase relative to the particle size of resin and pigment; (4) temperature at which electrophoresis occurs; (5) isoelectric point of the resin; (6) length of time of electro-deposition; (7) agitation or degree of agitation; and (8) presence or absence of plasticizers.

In practicing the present invention in the case of alkyd resins having low hydroxyl numbers, such resins are found to be more soluble in a non-polar solvent. Such alkyd resin of low hydroxyl number may be dispersed into a micro-colloidal state by adding a small amount of a polar solvent to the solution of the low hydroxyl number alkyd dissolved in the non-polar solvent.

In another but less preferred embodiment of the present invention, a high hydroxyl number alkyd resin is used, in which case the resin is dissolved in a polar solvent with the subsequent addition of a small amount of a non-polar solvent to obtain the micro-colloidal state. In either case, it has surprisingly been found that the addition to the alkyd resin of 0.1 to 5.0 parts of monomeric acrylonitrile assists in the formation of the colloid.

Insofar as the pigments of the present invention are concerned, it is preferred that they be as close to colloidal in size as possible. This is because it has been found, in accordance with the invention, that solutions and colloidal particles of macromolecules, polymers, and resins carry approximately the same charge as that of colloidal size pigment particles. A suitable pigment size range in some instances is 0.01 to 100 microns, although 0.05 to 50.0 microns is preferred, with best results being obtained at about 0.1 to 5.0 or 10.0 microns.

It is another discovery of the present invention that during the comminuting step wherein the pigments are reduced in size to colloidal dimensions, that there be present not only the resin but also a sufficient amount of a cross-linking agent for the resin that the resin becomes at least partially cross-linked within the structure of the pigment as will be more fully explained hereinafter.

In the case of alkyd resins, substantial quantities of zinc oxide added to the pigment have been found to be successful. Zinc stearate, zinc aluminate, and similar materials are also useful additives for alkyd resins, but in lesser quantities.

Furthermore, the addition of minor proportions of urea and melamine and/or their corresponding aldehyde-containing resins to alkyl resins, causes the alkyds to become more easily cross-linked, as does the material dicyandiamide.

Also, urea-formaldehyde resins and melamine-formaldehyde resins, used alone or together with alkyd resins, may be cross-linked with such materials as acid catalysts, including hydrochloric acid, acetic acid, and acidic materials such as urea nitrate and the like which accelerate in situ the solidification process, i.e. harden the resin and thus adhere the pigment coating to the desired article which is being coated electrophoretically in a non-aqueous medium. Phosphoric acid, boric acid, and excess phthalic anhydride and/or phthalic acid also have been found to be effective for this purpose.

In the case of epoxy resins, the addition of such materials as certain Friedel-Crafts catalysts, tertiary amines, and/or dicyandiamide serve to fix the resin within the structure of the pigment, and greatly enhance the adhesion of the paint containing the pigment to the resulting electrophoretically-coated article.

As for acrylic resins, such materials as free-radical catalysts, including among others, peroxides or the Natta butyl-lithium type of catalyst cause at least partial cross-linking, dimerization, trimer-formation, and the like which serves the purpose of adhering the pigment to the resin and thus to the coated article. It has also been found that certain higher molecular weight esters of most of the types of resins hereinbefore mentioned yield non-brittle materials which, when electro-deposited in accordance with the invention, exhibit, improved adhesion. Furthermore, the addition of curatives and accelerators to such latter materials is of distinct benefit; for example, para-quinone dioxime, sulfur, mercaptobenzothiazole, and/or certain selenium or tellurium compounds such as, tellurium diethyl dithiocarbamate, tetramethyl thiuram disulfide, benzothiazyl disulfide, and the like.

A further discovery of the invention is that certain materials, especially amphoteric oxides, and other solid amphoteric compounds, have the ability to retain a charged condition over an extended period of time; the classic examples found in this regard being activated silica xerogel or especially barium titanate. Thus, titanium dioxide may be activated in any manner (such as silica-aluminum cracking catalyst are activated) and/or titanium dioxide may be admixed with, coated with, or impregnated with barium titanate.

Other materials which have been found to hold an electric charge over an extended period of time when in the active form include, among others, silica, aluminum octoate, aluminum oleate, aluminum stearate, calcium stearate, certain montmorillonite clays of which kaolin, kieselguhr, and/or bentonite are typical, magnesium silicate, zinc stearate, titanium dioxide, alumino-silicates, silica-aluminas, barium titanate, and the like. This listing is not to be construed as completely all-inclusive but is given purely for the purposes of exemplifying the present invention.

For example, although specific "Bentones" will be discussed later in the present specification, such bentonite salts are, in accordance with the invention, added to thicken certain alkyd resin-containing paints. It has been found that such "Bentones" also assist the pigments in holding the electric charge and, in fact, hold an appreciable charge themselves. If only enhancement of the electric charge held is desired and no thickening of the paint is needed during coating by non-aqueous electrophoresis, the addition of a rather large proportion of a polar solvent tends to decrease the thickening action. Nitromethane and combinations of nitromethane with butyl alcohol and/or xylol have been found to be effective for this intended purpose.

Especially effective materials may be made starting with the hydrogel of finely divided materials of the types hereinbefore described. The water in the hydrogel then is replaced with an organic solvent to give a so-called organo-gel, and the solvent then is evaporated at an elevated temperature. Such particles may be further activated, for example, at elevated temperatures in the presence of steam, as is known in the art.

Such organo-gels, as known in the art, when prepared from hydrogels, as aforementioned, by the step comprising replacing the water in the hydrogel with an organic solvent, result in little or no shrinkage of the gel so that the density of the organo-gel is substantially the same as that of the original finely divided hydro-gels. For example, typical organo-gels which can be employed can be either titanium oxide or silicon oxide organo-gels, and/or co-gels of these materials (or any analogous materials) with mono-organo-siloxanes.

Especially effective materials for the colloidal pigment or the suspended or disbursed phase, for non-aqueous electrophoretic deposition by the invention, are obtained by milling various commercial grades and/or specially activated grades of titanium oxide gels and/or silica gels or the like and/or especially barium titanate, before or after organic-solvent evaporation, and which are referred to in recent years as xero-gels or aerogels, when the organic solvent has been subsequently removed.

As is well known, activated gels of this character contain surface areas ranging upward from 100 square meters per gram. Hence, even when milled to impalpable powders, each particle is itself highly porous and contains a pore area many times its exterior. This internal pore area is utilized to impregnate the same with partially cross-linked resins of the types hereinbefore described so that each particle may carry electrophoretically and adhere to an article a charge many times that which the particle could normally carry or coat. Also, since the pigment-pore surfaces are concave, they readily adsorb large amounts of fixed resins and thus become highly and semi-permanently charged adhesive particles of colloidal dimensions in accordance with the present invention.

In another embodiment of the present invention, the pigment is first impregnated with the resin, and the cross-linking material for the resin added after the colloidal dispersion of the resin-impregnated pigment is formed. It is, therefore, manifest that the particular sequence of forming the organogel, adding the resin, evaporation of the organogel-organic solvent, fixing the resin within the resulting xerogel pores, colloidally dispersing the system, electrophoretically depositing in a non-aqueous medium the resulting adhesive colloidal dispersion of resin and pigment, and the like, may be considerably varied by those skilled in the art and yet come within the teaching of the present invention.

Suffice it to say that the resins employed are advantageously at least partially dimerized, trimerized, or partially cross-linked during some step in treating the pigment and that the pigments employed are of the type which are capable of retaining an electrical charge over an extended period of time and are preferably about 0.1 to 5.0 microns in diameter and yet made highly porous by one of the methods hereinbefore described, so that the internal surface area of the pigment is manyfold that of the exterior of the pigment. By means of the combination aforementioned a dense, thick, homogeneous, electrophoretic coating is rapidly deposited and adhered upon an article dispersed within a non-aqueous medium in accordance with the present invention.

As regards the dispersing media, it has been found that the use of say about 94 to 99.7 percent xylol or other similar aromatic hydrocarbon together with about 0.3 to 6.0 percent each of trichloroethylene, isopropyl alcohol, butyl alcohol, methylethyl ketone and/or butyl-Cellosolve are effective for the purposes of the invention, the preferred amount of aromatic hydrocarbon being about 97 to 99 percent, with 1 to 3 percent of one or more of the other dispersing media.

If surface active agents are used at all, critically small amounts may, in certain instances, be somewhat advantageous; such as, for example, 0.005 to 3.0 percent or less, based on total composition, of cationic-type surface active agents including pyridinium chloride and/or primary amines of the formula R—NH$_2$ wherein R comprises a $C_1$ to $C_{12}$, desirably a $C_1$ to $C_{10}$, preferably $C_1$ to $C_7$ alkyl radical, aryl radical, alkaryl radical or aralkyl radical.

Further, it has been found that if drying oils are utilized, small amounts of such oils as dehydrated castor oil and/or sodium polymerized butadiene-1,3 are sometimes advantageous. The foregoing butadiene polymerized material is preferably air-blown before use.

It is another discovery of the present invention that castor oil-type alkyds with 26 to 40 percent phthalic anhydride content can be particularly well successfully electro-deposited, with the best results being obtained with a phthalic anhydride content of about 30 to 34 percent, and with the acid number of the resin being between 5 and 10. Particularly detergent-resistant films upon curing of such depositions are produced.

An additional finding of the present invention is that the preferable dielectric constant of the resin-solvent mixture is from 2.0 to 2.5 to 6.0, preferably 2.5 or 3.5 to 4.0, depending on the ingredients, whereas, the dielectric constant of both the pigment and the resin should be substantially higher or lower (i.e. there should be considerable disparity between the resin-solvent mixture and that of the resin and pigment).

Still another discovery of the present invention is that pretreatment of the solid materials constituting the resin and particularly the pigment of modify surface characteristics thereof provides a beneficial result. This may be accomplished by subjecting the pigment to prolonged contact or to contact at elevated temperatures with monoisocyanates, such as decyl, dodecyl, hexyl and phenyl isocyanates and/or polyisocyanates such as toluene diisocyanate, methylene bisparaphenylene isocyanate and decylene diisocyanate, etc. Other polyisocyanates such as benzene triisocyanates, and/or diisothiocyanates help the migration of the solid particles and the deposition rate upon the desired electrode. The pigments may also be pretreated with hydroxyl-reactive organosilanes such as trimethyl chlorosilane, vinylchlor- and/or alkoxy silanes, etc., to provide organophillic or hydrophobic surfaces.

With respect to the concentration of resin and solvent, it has been found, as aforementioned, not only that the amount of colloidally dispersed solid materials should not exceed 30%, but further that the amount of solid colloidal materials should not be less than about 5% with an optimum range being 10% to 25 or 28%.

Another finding of the invention is that the modification of the surfaces of the pigment and, in some cases, certain resins, may be made in situ by incorporating into the electrophoretic coating compositions aforementioned, a reactive organic compound such as an organic isocyanate and/or an organic silicon compound (including ethyltriethoxysilane or the like), which has reactive hydroxy groups, e.g., siloxymethyl, etc., which tend to be preferentially adsorbed on particle surfaces. Reaction may then occur with the pigment or resin particles at elevated temperatures during subsequent heat treating of the deposited coating.

By utilizing a relatively non-volatile compound that is capable of a coupling action, i.e., contains a group which can react with the resin and another group which may react with the pigment and/or the surface to be coated, chemical bonding of the binder to both the resin and the underlying surface occurs. Examples of materials capable of such coupling action are polyisocyanates such as TDI (toluene diisocyanate), MDI (methylene bis-p,p'-phenyleneisocyanate) which are suitable for alkyd and epoxy compositions; siloxanes, containing a vinyl group such as has vinyltriethoxysilane, gamma-methacryloxypropyltrimethoxysilane, particularly for unsaturated resinous binders such as acrylics or acrylates; gamma-aminopropyltriethoxysilane, N,N-bis(betahydroxylethyl)-gamma-aminopropyltriethoxysilane, gamma-glycidoxypropyltrimethoxysilane, beta(3,4-epoxycyclohexyl)ethyltrimethoxysilane, etc., which is preferred for epoxy and alkyd resin binders. The epoxy silanes are also suitable for acrylics and resins prepared from unsaturated monomers.

Additionally, conventional rubber-type accelerators, such as diphenyl guanidine, tetramethyl thiuram disulfide, mercaptobenzothiazole and/or N-cyclohexyl-2-benzothiazyl sulfenamide, help to promote the rate of deposition of resin and pigment colloidal particles on the desired electrode.

In general, for the purposes of the present invention, it has been found that the more polar the polymer and the lower the dielectric constant of the electrophoretic media (with respect to the non-aqueous dispersing phase) the better the results. Highly polar resins are best.

Colloidal dispersions containing the pigment titanium dioxide, and the use of alternating current superimposed upon direct current, surprisingly, is distinctly superior as to rate of deposit, homogeneity, and appearance of the final coating, particularly when the maximum value of the A.C. potential is greater than that of the D.C. potential. Additionally, the use of 0.1 to 10.0 weight percent based on pigment of added aromatic amine-montmorillonite reaction products and/or such products as "Bentone-34" and/or "Bentone-38" (i.e., dimethyl dioctadecyl ammonium bentonite is "Bentone-34") are advantageous for the purposes of the present invention. Excellent results are also obtained using 0.1 to 8.0%, i.e., 5% based on titanium dioxide of the bentonite salt formed by ion-exchange of bentonite with a $C_{10}$ to $C_{14}$ aliphatic primary or secondary amine.

Also, in terms of measured units of wave length, it is another finding of the present invention that the polymeric resin size should be less than 10,000 angstroms, advantageously less than 4,000 to 8,000 angstroms and preferably less than 600 to 1,000 angstroms and that the resin-precipitant causing the colloidal dispersion of resin and pigment to form be less volttile than the solvents used to dissolve the resin.

It is a further discovery of the present invention that the average voltage gradient within the coating composition during deposition should be between 300 volts per inch and 3,500 volts per inch, and preferably between 500 volts per inch and 2,500 volts per inch. With the electrode spacing about 1.5 to 3.0 inches, the electromotive force should be 0.5 to 10.0 kilovolts, the amperage being 0.5 or 5.0 to 80 milliamperes. Very good results have been obtained at an electrode spacing of 2 inches and with a voltage preferably in the range of 1.0 to 5.0 kilovolts and a current of preferably 1.0 or 1.5 to 50 milliamperes. The coating time during which the electromotive force is impressed should be about 0.1 to 10.0 minutes, preferably about 0.3 to 5.0 minutes at a temperature between about 20° and 35° C. and in some instances critically between 25° and 30° C., and varying not more than 0.1 to 1.0 degree per minute. In building up coatings in excess of about 0.1 to 2.0 mils use a number of different kilovolt and milliampere readings, rather than to make the entire coating at once, and also to initially electro-deposit one type of resin followed by another type of resin of the types hereinbefore described, use 2–10 coats.

In order to more fully illustrate but not to limit the present invention, the following examples are given. Unless otherwise indicated, the percentages and amount are on a weight basis.

EXAMPLE I

A 10% solution in xylene (98%) and butyl alcohol (2%) of a castor oil-modified alkyl resin having a 32% phthalic anhydride content and an acid number of 5 is prepared. This solution is placed in an electrolytic cell having an electrode spacing of 2.0 inches and one part of titanium dioxide having its largest particle size at a rating of more than 7 on the Heigman scale is added for each three parts of alkyd resin. A direct potential of 5 kilovolts is then applied at a current of 1.5 milliamperes for 0.3 minute. The result is a dense homogeneous coating of pigment bound to the desired electrode, the coating having a thickness of 0.3 mil. Good gloss and adhesion are obtained by heating for 40 minutes at 370° F.

EXAMPLE II

The same general procedure as in Example I is repeated except that the alkyd resin is employed at a concentration of 20% with the resin having a phthalic anhydride content of 36%. Also, just before potential is applied, 2% based on total composition of trichloroethylene is added and the pigment-to-alkyd resin ratio is 1:5 rather than 1:3. The acid number of the alkyd resin is 7. After applying a potential of 3.0 kilovolts and 1.5 milliamperes for 0.5 minute at an electrode spacing of 1.5 inches, a dense, homogeneous, smooth coating on the desired electrode of 0.34 mil thickness is noted. Good gloss and adhesion are obtained by heating at 420° F. for 20 minutes.

EXAMPLE III

The same general procedure as in Example I is again repeated except that the castor oil-modified alkyd resin has a phthalic anhydride content of 39% and an acid number of 10, the pigment (titanium dioxide) to resin ratio being 1:4. A potential of 2.5 kilovolts and 40 milliamperes is used for 0.2 minute at an electrode spacing of 2.5 inches. The result is a smooth dense coating of 0.3 mil thickness of alkyd resin and titanium dioxide pigment deposited upon the desired electrode. Good gloss and adhesion are obtained by heating at 385° F. for 30 minutes.

EXAMPLE IV

The identical procedure as in Example I is repeated except that 1 kilovolt A.C. current superimposed on 1 kilovolt D.C. current (rather than 5 kilovolts of D.C. current per se) is used with a coating resulting which is approximately 55% as thick as in Example I but which is more glossy and dense.

EXAMPLE V

The same general procedure as in Example I is repeated identically except that 100 parts by weight of an epoxy resin having a molecular weight of 375 are formulated with 10 parts of Bentone-34, 15 parts by weight of diethylene triamine, 15% based on total composition of the amine catalyst dicyandiamide and 5 parts of the pigment titanium dioxide. The result is a dense uniform film upon the desired electrode but which is not as glossy in appearance as in Example I. However, the adhesion is noted to be twice that of the film in Example I.

EXAMPLE VI

The same general procedure as in Example I is repeated identically except that 50 parts by weight of an epoxy resin having a molecular weight of 1,000 is admixed with 50 parts by weight of a styrenated alkyd resin with the same general results as in Example V.

EXAMPLE VII

The same general procedure as in Example I is repeated substituting for the castor oil-alkyd resin an acrylic resin of 100% polymethylmethacrylate with the result that the film deposited in Example I appears more glossy. However, the adhesion is found to be approximately ¾ that of the adhesion compared to the coating of Example I.

EXAMPLE VIII

Run A

A paint composition, not in accordance with the present invention, but of the following proportions and dispersed in liquid carbontetrachloride: (electrode space— 1¼ in. and 15,000 volts).

| | Grams |
|---|---|
| "Rhodene L9/50" resin * | 100 |
| Zinc oxide | 130 |
| Yellow litharge | 20 |
| Cobalt naphthenate (drier) | 0.5 |
| Manganese naphthenate (drier) | 0.5 |
| Toluene (carrier liquid) | 100 |

These materials are milled together in a ball mill for eight hours. * "Rhodene L9/50" is the trademark for a linseed oil-modified alkyl resin.

After mixing the above paste is dispersed in 100 grams of a halogenated hydrocarbon such as carbon tetrachloride and becomes the material for the bath. The coating so obtained on the object after a short drying time comprises the pigments, the resins and the driers; polymerization and hardening occurs after deposition.

However, the resulting coating formed is found to be uneven and this is attributed to the fact that the total deposition time is in the order of two seconds, as opposed to an optimum deposition time, in accordance with the present invention, of about 30 seconds.

It is also noted that the pigment-to-resin binder ratio is incorrect in that the foregoing paint composition contains a major proportion of pigment relative to resin, whereas, in accordance with the invention, an optimum pigment-to-resin ratio would be just the opposite, i.e., about one part of pigment to 3 parts resin. It is further noted that the composition of the foregoing paint hereinbefore described has an unduly high solids content making the same difficult to handle for the purposes of the invention. Also, a thickness of one mil is obtained after only one second, such a deposition rate being considerably too fast for uniform deposition as will be more fully described hereinafter.

Run B

In accordance with the invention, the identical procedure as in Example VIII, Run A, is repeated except that the total solids content of resin and pigment is regulated to be only 20 weight percent, with a reverse ratio of 3 parts resin to one part pigment. Further, Bentone-38 in an amount of 2 to 4 weight percent pased on pigment (i.e., 3.0%) is added in accordance with the present invention.

It is found that a more uniform, lustrous, adherent paint coating of the same one mil thickness as in Run A is formed but that the deposition desirably takes place over a period of approximately 30 seconds (as opposed to one second) which results in a much more even deposition or coating of excellent adherent characteristics to metal (e.g., stainless steel) and to other surfaces of articles of manufacture.

Resort may be had to modifications and variations of the disclosed embodiments without departing from the spirit of the invention or the scope of the appended claims.

What is claimed is:
1. A suspension for electrophoretically coating articles of manufacture comprising an organic-solvent-soluble-thermosetting resin selected from the group consisting of heat-convertible alkyd resins, epoxy and acrylic resins having particles colloidally suspended in an organic dielectric solvent together with a pigment having an average size of .1 to 5 microns, the concentration by weight of total resin and pigment being about 5% to 30% based on the weight of total composition, the pigment-to-resin ratio being from (1:25) 1:2.5 to 1:6, said solvent comprising an admixture of about 95 to 99.5 weight percent of a non-polar resin-solvent together with about 0.5 to 5.0 weight percent, sufficient to cause said resin to assume colloidal dimensions, of a polar organic solvent, the dielectric constant of the resin-solvent mixture alone being 2 to 6.
2. A composition according to claim 1 in which said resin is selected from the group consisting of alkyd resins having acid numbers between about 5 and 10, acrylic resins, epoxy resins, and mixtures thereof.
3. A composition according to claim 2 in which the resin comprises a castor oil-modified alkyd resin together with about 30 to 40 weight percent based on total resin of phthalic anhydride.
4. A composition in accordance with claim 3 in which the pigment to resin ratio is between about 1:3 to 1:5, the weight percent of total solids of resin and pigment being between about 10% and 28%.
5. A composition in accordance with claim 3 in which the phthalic anhydride contained in the alkyd resin is between about 30 and 34 weight percent based on total resin.
6. A composition in accordance with claim 2 in which the pigment to resin ratio is between about 1:3 to 1:5.
7. A composition in accordance with claim 2 which comprises a styrenated alkyd resin having about 20 to 35% polystyrene based on total resin.
8. A composition in accordance with claim 2 in which the resin comprises a silicone-modified alkyd resin, said resin containing about 20 to 35% silicone based on total resin.
9. A composition in accordance with claim 1 in which the pigment as well as the resin is of colloidal size.
10. A suspension for electrophoretically coating articles of manufacture comprising an organic-solvent-soluble-thermosetting resin selected from the group consisting of heat-convertible alkyd resins, acrylic resins and epoxy resins and having dispersed particles suspended in an organic dielectric solvent mixture together with a pigment having an average size of 0.1 to 5 microns, the concentration by weight of total resin and pigment being about 5% to 30% based on the weight of total composition, the pigment-to-resin ratio being 1:2.5 to 1:6, said solvent mixture comprising polar and nonpolar liquids, one of said liquids being 95 to 99.5% of said mixture and the other being 0.5 to 5% of said mixture, said resins being more soluble in the said liquid that is present in greatest proportion.
11. A composition in accordance with claim 10 in which said resin is an alkyd resin having an acid number between about 5 and 10.
12. A composition in accordance with claim 11 in which the pigment to resin ratio is between about 1:3 to 1:5.
13. A composition in accordance with claim 10 in which the pigment as well as the resin is of colloidal size.
14. A composition in accordance with claim 10 in which a member selected from the group consisting of said resin, said pigment, and mixtures thereof are modified by contact with a member selected from the group consisting of organic isocyanates and hydroxyl-reactive silanes.
15. A composition in accordance with claim 14 in which the pigment is selected from the group consisting of titanium dioxide, lithopone, titanium dioxide with up to 10 weight percent alumina, zinc sulfide, mixtures thereof, and mixtures thereof with minor proportions of alumina.
16. A composition in accordance with claim 10 in which a member selected from the group consisting of said resin, said pigment, and mixtures thereof are modified by contact with a member selected from the group consisting of organic isocyanates and hydroxyl-reactive organosilanes.
17. A composition in accordance with claim 16 in which the pigment is selected from the group consisting of titanium dioxide, lithopone, titanium dioxide with up to 10 weight percent alumina, zinc sulfide, mixtures thereof, and mixtures thereof with minor proportions of alumina.
18. In a process for coating articles of manufacture, the improvement which comprises immersing said article into a bath containing a positive electrode and a negative electrode and the composition of claim 10 and subjecting said article as one of said electrodes to a direct current voltage of 300 to 3500 volts per inch of electrode spacing and a current of less than about 100 milliamperes per square foot for a time sufficient to deposit on the surface of said article an adherent film of at least about 0.1 mil thickness.
19. Process in accordance with claim 18 in which about .5 to 2.5 kilovolts per inch of electrode spacing are employed for a time of at least one minute and until at least about 0.3 mil thickness of film coating on said article is obtained.
20. A method for coating articles of manufacture in accordance with claim 9 wherein the A.C. voltage having an instantaneous maximum value gerater than that of the D.C. voltage is impressed upon said D.C. voltage.
21. An improved method for coating articles of manufacture which comprises immersing the article in a bath containing the composition of claim 1 and subjecting said article to A.C. voltage impressed upon D.C. voltage; said A.C. voltage having an instantaneous maximum electromotive force greater than that of said D.C. voltage.
22. A suspension for electrophoretically coating articles of manufacture comprising organic-solvent-soluble thermosetting resin which has been at least partially cross-linked and selected from the group consisting of heat-convertible alkyd resins, epoxy resins and acrylic resins, said resin being colloidally suspended in organic resin-solvent together with a bentonite salt and a pigment having an average diameter not substantially greater than 2.0 microns, the concentration by weight of total resin and pigment being about 5% to 30% based on the weight of total composition, the pigment-to-resin ratio being 1:2.5 to 1:6, said resin-solvent comprising an admixture of about 85 to 99.5 weight percent of a non-polar resin-solvent together with a suffiicent amount of a polar-resin-solvent suffiicent to cause said resin to assume colloidal dimenisons.
23. An improved method for coating artciles of manufacture which comprises immersing said article in a bath containing the composition of claim 22 and subjecting said article to A.C. voltage impressed upon D.C. voltage, said A.C. voltage having an instantaneous maximum electromotive force greater than that of said D.C. voltage.
24. The method of coating an article having conductive portions thereof at or closely underlying surfaces to be coated, which comprises immersing said article in a non-aqueous liquid composition comprising (a) an organic-solvent-soluble resin selected from heat-convertible alkyd resins, heat-convertible epoxy resins and acrylic resins capable of forming a solid, non-tacky film, (b) a pigment having an average particle size of .1 to 10 microns, (c) an organic dielectric liquid, a major portion of which is a solvent for said resin, (d) means comprising a non-solvent for said resin for forming and retaining said resin in particulate but suspended form, the concentration of total resin plus pigment being 5 to 30% of the total weight of said composition, the pigment-to-resin ratio being 1:2.5 to 1:6, the dielectric constant of said organic dielectric liquid and of both said resin and said pigment being substantially different, the dielectric constant of the resin-solvent mixture being 2 to 6, applying an electric potential between an electrode in contact with said composition and said conductive portions of said article, said potential having an average value in one direction of at least 300 volts per inch of separation between said electrode and the closest conductive surface of said article immersed in said composition, removing the article from said liquid composition and heating the coating on said article to soften the resin of said coating.

25. The process according to claim 24 wherein the coated surface of the article is heated above the softening point of the resin to improve gloss and adhesion.

References Cited

UNITED STATES PATENTS 2,898,279  8/1959  Metcalfe et al. _____ 204—181
3,047,507  7/1962  Winslow _____ 252—75

OTHER REFERENCES

Chem. Abstracts, vol. 53, No. 13, Dec. 24, 1962, p. 15977C.

DONALD E. CZAJA, *Primary Examiner.*

R. W. GRIFFIN, *Assistant Examiner.*

U.S. Cl. X.R.

117—132, 134, 135.1, 161, 167; 204—181; 260—22, 30.6, 30.8, 32.4, 32.6, 32.8, 33.2, 33.4, 33.6, 33.8, 37, 40, 41

UNITED STATES PATENT OFFICE
CERTIFICATE OF CORRECTION

Patent No. 3,450,655 June 17, 1969

Lester L. Spiller

It is certified that error appears in the above identified patent and that said Letters Patent are hereby corrected as shown below:

Column 1, line 54, cancel "the". Column 2, line 51, "1.00 to 1.25 inches" should read -- 1.00 or 1.25 inches --. Column 4, line 11, "488,582" should read -- 448,582 --. Column 5, line 64, "resultaning" should read -- resulting --. Column 10, line 51, "volttile" should read -- volatile --. Column 12, line 62, "pased" should read -- based --; line 63, "i.e." should read -- e.g. --. Column 13, line 11, cancel "(1:25)". Column 14, line 33, "gerater" should read -- greater --.

Signed and sealed this 21st day of April 1970.

(SEAL)
Attest:

Edward M. Fletcher, Jr.  WILLIAM E. SCHUYLER, JR.
Attesting Officer  Commissioner of Patents